United States Patent [19]
Sikka

[11] Patent Number: 5,016,810
[45] Date of Patent: May 21, 1991

[54] METHOD FOR IMPROVING WELDABILITY OF NICKEL ALUMINIDE ALLOYS

[75] Inventor: Vinod K. Sikka, Clinton, Tenn.

[73] Assignee: The United States of America as represented by the Department of Energy, Washington, D.C.

[21] Appl. No.: 398,575

[22] Filed: Aug. 25, 1989

[51] Int. Cl.$^5$ .............................................. B08B 5/00
[52] U.S. Cl. ............................ 228/206; 228/263.13; 134/3
[58] Field of Search ............... 228/206, 263.13; 134/3

[56] References Cited
U.S. PATENT DOCUMENTS

| | | |
|---|---|---|
| 3,487,520 | 1/1970 | Lenhart et al. |
| 4,188,237 | 2/1980 | Chasteen ............. 228/206 X |
| 4,324,594 | 4/1982 | Chasteen ............. 228/206 X |
| 4,339,282 | 7/1982 | Lada et al. .................. 134/3 |
| 4,613,368 | 9/1986 | Chang et al. ......... 420/459 X |
| 4,655,383 | 4/1987 | Fournes et al. ....... 228/206 X |

Primary Examiner—Kenneth J. Ramsey
Attorney, Agent, or Firm—Katherine P. Lovingood; Stephen D. Hamel; William R. Moser

[57] ABSTRACT

A process for cleaning the surface of aluminides to prepare them for welding by first washing the surface to be welded with a chemical that removes aluminum, an inhibitor to strong welds.

1 Claim, 3 Drawing Sheets

METHOD FOR IMPROVING WELDABILITY OF NICKEL ALUMINIDE ALLOYS

This invention relates to a method for improving weldability of aluminides, particularly nickel aluminides, and was developed pursuant to a contract with the United States Department of Energy.

BACKGROUND OF THE INVENTION

Due to its long range ordered structure, $Ni_3Al$ is a very strong alloy; however, its brittleness has rendered it useless for structural applications. Recently, the intermetallic and its alloys have been attracting much attention since it was found that addition of a small amount of boron significantly increases the ductility of an otherwise very brittle alloy. A problem that now must be addressed is the difficulty encountered when attempts are made to weld the alloy.

Nickel aluminide has a face centered cubic (FCC) crystalline structure, and, like many FCC alloys, impurities have a way of being transported to the grain boundaries rendering the material brittle and subject to hot cracking upon welding.

Studies done at Oak Ridge National Laboratory have established that boron content has an effect on weldability. Results indicate that hot cracking response to boron content increases at low boron levels below 50 ppm and at higher levels above 300 ppm. Fortunately, a minimum is obtained at about 200 ppm which is about an optimum boron content for ductilizing $Ni_3Al$. Thus the presence of boron in a concentration range of 100 to 300 ppm actually improves the weldability of $Ni_3Al$.

Other work involving mechanical and electropolishing a surface prior to welding helped reduce cracking but did not provide sufficient improvement to be considered a solution to the problem. Therefore there is a need to provide a method for welding aluminides that does not result in hot cracking of the metal.

SUMMARY OF THE INVENTION

In view of the above needs, it is an object of this invention to provide a process for welding aluminides that avoids the problem of hot cracking.

Another object of this invention is to provide a process for welding nickel aluminides at specific surface locations.

It is another object of this invention to provide a process for reducing aluminum from the surface of an aluminide at the location of a weld. Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims. To achieve the foregoing and other objects and in accordance with the purpose of the present invention, as embodied and broadly described herein, the process of this invention may comprise a process for welding aluminides comprising treating the surface to be welded to render the surface relatively aluminum-free. This process is suitable for aluminides of metals that are weldable in their elemental state. For instance, iron aluminides would not respond well to this process because iron is not readily weldable; however, the process is appropriate for the aluminide of nickel, a weldable metal. Applicants have found that if $Ni_3Al$ first washed with ferric chloride, a very good weld results. This is an important development in aluminide research, since this new group of alloys, although extremely strong and ductile, would be useless if they could not be welded.

DETAILED DESCRIPTION OF THE PREFERRED EMBODIMENT

After the development of the fabricable nickel aluminides, work was begun to assemble pieces by way of welds. The result was failed welds; stress put on the assemblies consistently failed at the welds. There were attempts to clean the surface by mechanical and electropolishing with no success.

In the course of studying corrosion resistance of nickel aluminides, scientists at Oak Ridge National Laboratory developed data that is reproduced in the Table. Applicant speculated that a substance that would corrode the metal might effectively clean the metal; thus, the corrosive materials of the Table, notably $Fe_3Cl$, $HNO_3$ and $HCl$, were tested.

Trials with nitric acid established that it is an excellent choice for cleaning and surface of the metal; however, no improvement of weldability was observed. Similarly, HCl was tested but its use was deemed impractical due to high concentrations of the acid that would be required to clean the surface.

Finally, it was found that ferric chloride sufficiently cleaned the suface to result in a weld that when tested withstood stress better than the metal itself. In other words, failure occurred in the metal while the weld remained intact.

In the preferred embodiment surface to be welded is immersed in a saturated soltuion of ferric chloride and rinsed with water. Applicant believes the wash causes a chemical reaction whereby ferric chloride is reduced to ferrous chloride by the aluminum in the aluminide. The aluminum goes into solution and is rinsed away leaving a surface rich in the other metal, such as nickel in the case of nickel aluminide. Therefore, any treatment that would remove aluminum from the surface and leave it rich in the second metal would be sufficient to perform the invention, provided the second metal is weldable. The surface removed by the cleaning is at the submicron level. If one desires to clean only part of a surface and weld it, the surface not to be welded is merely covered with a coating.

The reason the $HNO_3$ was unsuccessful was because the reaction upon immersion results in aluminum oxidation at the surface. The high rate of oxygen adsorption of this aluminum-rich surface interferes with the weldability of the surface.

EXAMPLE

Alloys tested were designated IC-50 and IC-218, IC-221, IC-306 and IC-357 with the following weight percent compositions:

IC-50 Ni-11.3Al-0.6Zr-0.02B
IC-218 Ni-8.5Al-7.8Cr-0.8Zr-0.02B
IC-221 Ni-8.5Al-7.8Cr-1.7Zr-0.02B
IC-306 Ni-9.01Al-13.10Fe-6.95Cr-0.34Zr with 150 ppm B, 50 ppm Ce and 300 ppm C
IC-357 Ni-9.54Al-6.95Cr-11.2Fe-0.35Zr-1.28Mo-0.02B At the start of the wash the ferric chloride solution is red and becomes green when its strength is lost by the conversion from ferric chloride to ferrous chloride. A surface chemistry check by scanning electron microscope confirmed the cleaned surface to be free of aluminum. Improvement in the weldability was measured using a Sigmajig test that determines the stress above which cracking occurs during welding.

Figure 1:
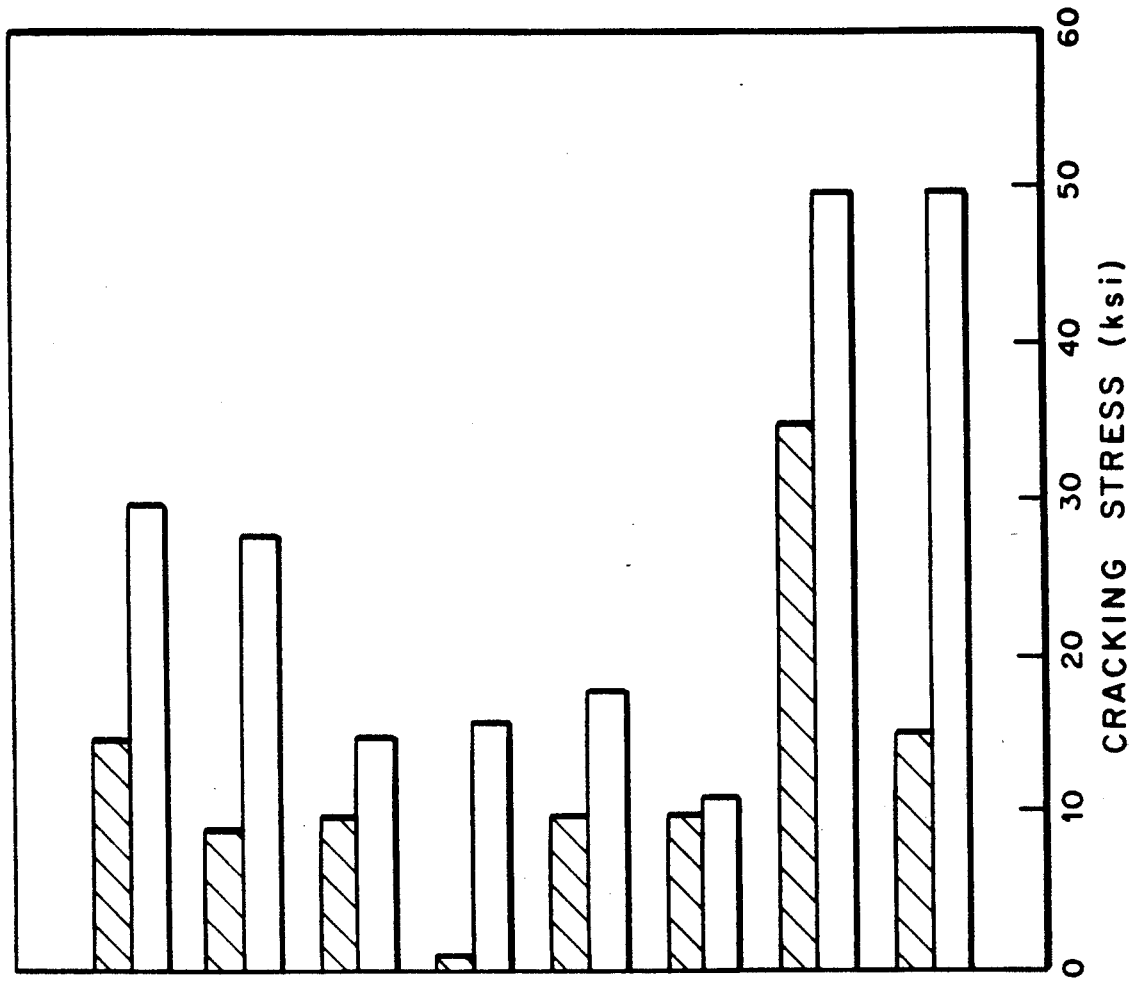
FIG. 1 shows Sigmajig cracking stress values for nickel aluminides before and after cleaning in comparison with two commercial stainless steels.

The results of the test are presented in the FIG. 1. The bars identified by a specimen number followed by th word "range" represents multiple lots of the same composition which may differ by a small variation. The slashed bar represents the lowest stress required to cause cracking upon welding while the open bar represents the highest stress required to cause cracking upon welding. There are other values between the high and the low of other intermediate lots. The specimens identified as "as received" and "cleaned" represent before and after cleaning. The slashed bar indicates an as received specimen that was welded and the stress required to cause cracking in specimens cleaned with ferric chloride before welding.

Results now cleaning increased the threshold stress by a factor of approximately 3 for IC-50 and by a factor of over 15 for IC-218. Note that the stress to initiate cracking of nickel aluminides in the cleaned condition is approaching that of the stainless steels, which are considered to be highly weldable.

Figure 2:
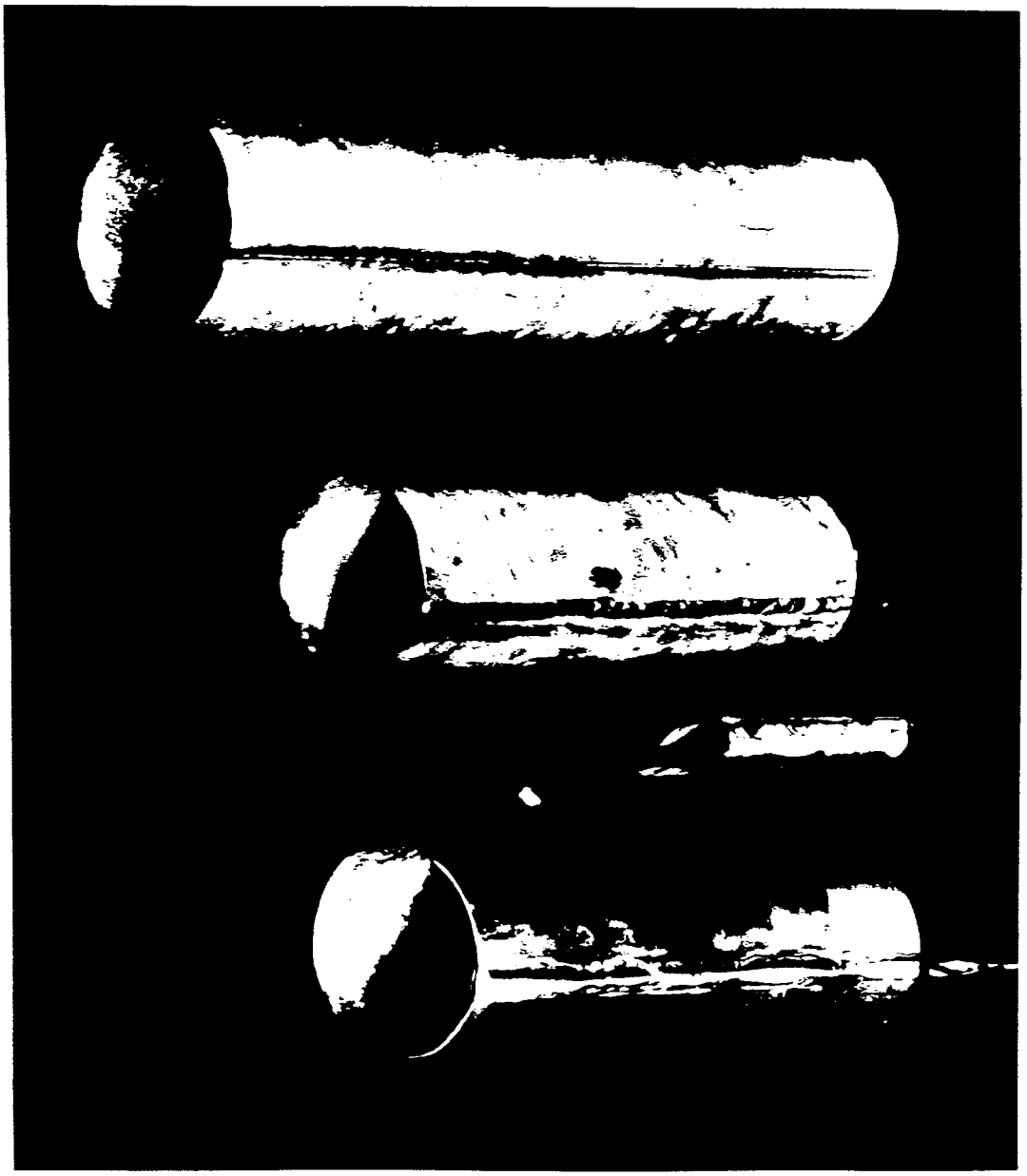
FIG. 2 is a photograph of tubes welded before and after cleaning by gas tungsten arc and electron-beam welding process and also a gas tungsten arc-welded specimen after compression to demonstrate strength and ductility.

Based on the improvement observed in the Sigmajig test, tubes were welded by electron beam and gas tungsten arc, see the photograph of FIG. 2. The first tube on the left was welded without cleaning. It showed that the weld was of poor quality, did not give full penetration, and required a great deal of cleaning and final grinding. The next tube was welded by gas tungsten arc as used in the first case, except it was cleaned prior to welding. This tube shows excellent weld penetration and did not require any post weld preparation. A flattened tube piece in between first and second tube shows that the weld is of excellent quality and has a good ductility as the base metal. The last tube on the right shows a electron-beam weld, which is of excellent quality.

Figure 3:
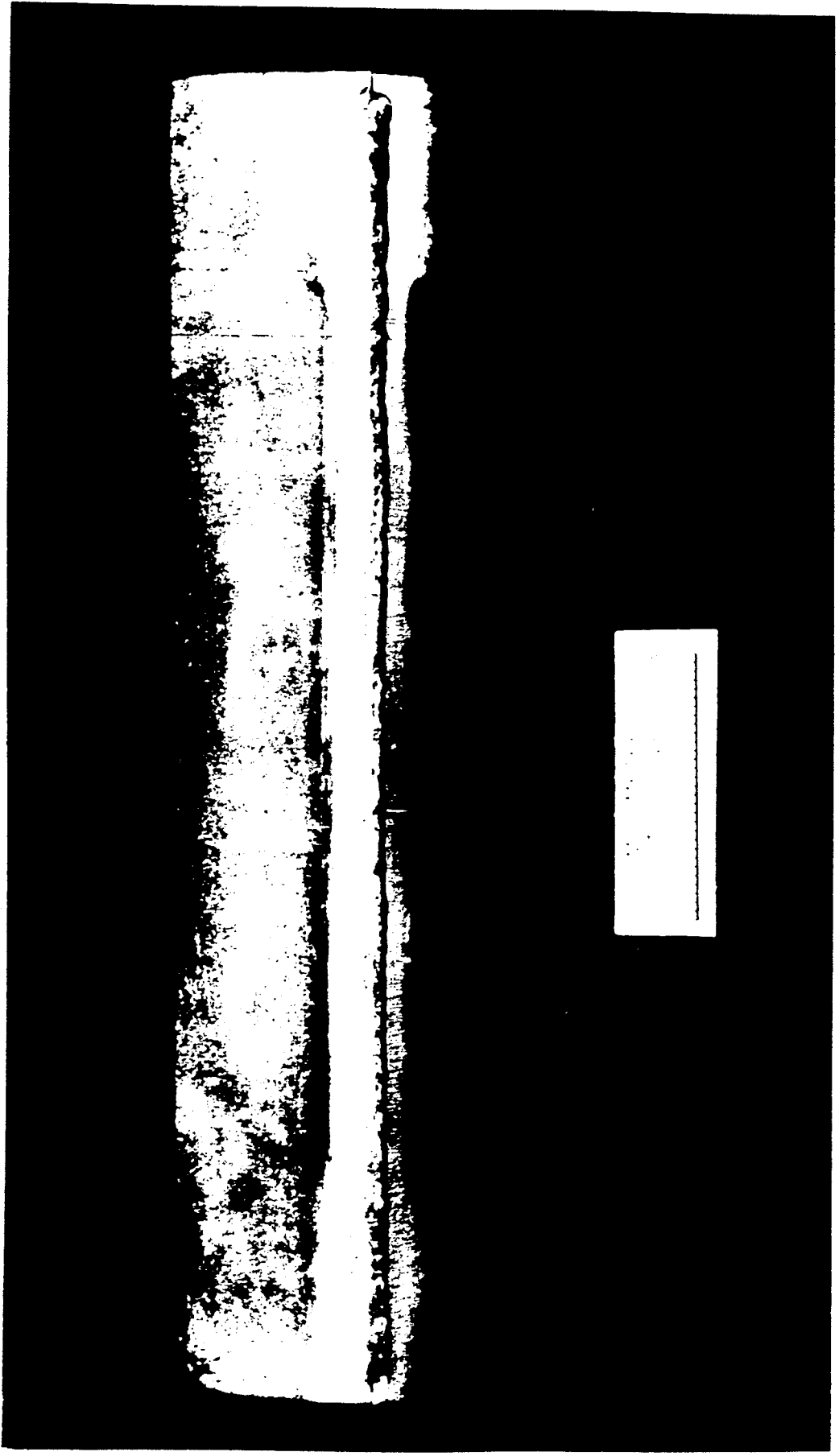
FIG. 3 is a photograph of a tube welded by the gas tungsten process in the as cast condition.

The same cleaning procedure was found to be extremely useful in welding the as-cast tube blank, FIG. 3. Except for the electron-beam weld, all gas tungsten arc welds were made using a filler metal. The Sigmajig welds were without a filler metal.

I claim:

1. A process for welding aluminides comprises treating the surface to be welded with a solution consisting essentially of ferric chloride in an inert carrier medium and subsequently welding said surface.

* * * * *